(12) United States Patent
Hehenberger

(10) Patent No.: US 8,853,882 B2
(45) Date of Patent: Oct. 7, 2014

(54) ENERGY GENERATING INSTALLATION

(76) Inventor: Gerald Hehenberger, Klagenfurt (AT)

( * ) Notice: Subject to any disclaimer, the term of this patent is extended or adjusted under 35 U.S.C. 154(b) by 0 days.

(21) Appl. No.: 13/979,856

(22) PCT Filed: Mar. 12, 2012

(86) PCT No.: PCT/AT2012/000062
§ 371 (c)(1),
(2), (4) Date: Jul. 16, 2013

(87) PCT Pub. No.: WO2012/119171
PCT Pub. Date: Sep. 13, 2012

(65) Prior Publication Data
US 2013/0296090 A1 Nov. 7, 2013

(30) Foreign Application Priority Data
Mar. 10, 2011 (AT) ................................. A 331/2011

(51) Int. Cl.
*F03D 9/00* (2006.01)
*F16H 48/30* (2012.01)
*H02K 7/00* (2006.01)
*F03D 11/00* (2006.01)
*F03B 11/06* (2006.01)
*F16H 48/34* (2012.01)
*F03D 11/02* (2006.01)
*H02K 7/18* (2006.01)

(52) U.S. Cl.
CPC ................ *F16H 48/34* (2013.01); *H02K 7/003* (2013.01); *Y02E 10/226* (2013.01); *F03D 9/002* (2013.01); *F03D 11/0008* (2013.01); *Y02E 10/725* (2013.01); *F03B 11/06* (2013.01); *Y02E 10/722* (2013.01); *H02K 7/1838* (2013.01); *F03D 11/02* (2013.01)

USPC ............................................. 290/55; 475/150

(58) Field of Classification Search
CPC ..... F16H 48/34; F03D 11/0008; F03D 11/02; F03D 9/002; H02K 7/003; H02K 7/1838; Y02E 10/725; Y02E 10/226; Y02E 10/722
USPC .................................. 475/5, 150; 290/44, 55
See application file for complete search history.

(56) References Cited

U.S. PATENT DOCUMENTS 4,832,637 A * 5/1989 Goluba ............................ 440/83
5,580,183 A * 12/1996 Brackoneski et al. ..... 403/359.1
(Continued)

FOREIGN PATENT DOCUMENTS

| DE | 2726775 | 12/1977 |
|----|---------|---------|
| DE | 10 2007 047317 | 4/2009 |
| EP | 1283359 | 2/2003 |

(Continued)

OTHER PUBLICATIONS

International Search Report dated Aug. 1, 2012, corresponding to PCT/AT2012/000062.
Austrian Search Report dated Nov. 7, 2011, corresponding to the Foreign Priority Application No. A 331/2011.

*Primary Examiner* — Dirk Wright
(74) *Attorney, Agent, or Firm* — Young & Thompson

(57) ABSTRACT

Disclosed is an energy generating installation, especially a wind power station, including a drive shaft, a generator (8) and a differential transmission (11 to 13) provided with three drives or outputs. A first drive is connected to the drive shaft, one output is connected to a generator (8), and a second drive is connected (23) to a differential drive (6). A ring gear carrier (18) is connected to a generator shaft (24). The generator shaft (24) is mounted (25) via the ring gear carrier (18) on a housing (26) of the generator (8).

20 Claims, 2 Drawing Sheets

(56) References Cited

U.S. PATENT DOCUMENTS

Figure 1:
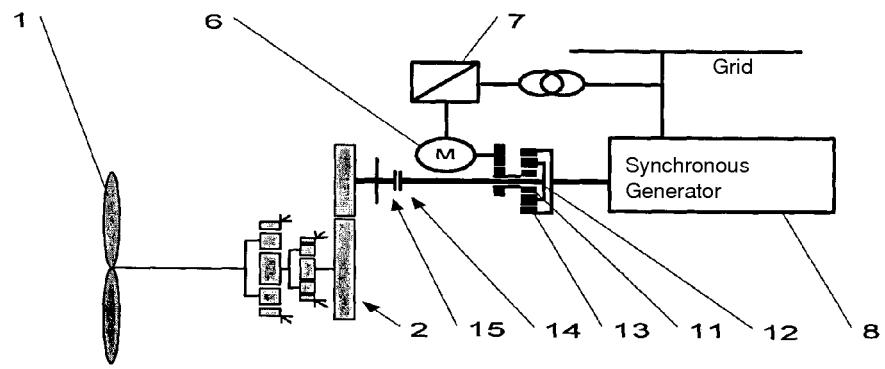

| | | | |
|---|---|---|---|
| 7,649,277 B2 * | 1/2010 | Nitzpon et al. | 290/55 |
| 8,206,262 B2 * | 6/2012 | Hehenberger | 477/37 |
| 8,313,298 B2 * | 11/2012 | Berger et al. | 416/170 R |
| 8,790,203 B2 * | 7/2014 | Hehenberger | 475/5 |
| 2012/0038156 A1 * | 2/2012 | Hehenberger | 290/44 |

FOREIGN PATENT DOCUMENTS

| | | |
|---|---|---|
| WO | 2008/061263 | 5/2008 |
| WO | 2010/135754 | 12/2010 |

* cited by examiner

ENERGY GENERATING INSTALLATION

The invention relates to an energy generating installation, especially a wind power station, with one drive shaft, one generator, and with a differential transmission with three drives and outputs, a first drive being connected to the drive shaft, one output being connected to a generator, and a second drive being connected to a differential drive, a ring gear carrier being connected to a generator shaft.

Wind power stations are growing in importance as electricity generating installations. This fact and medium voltage power electricity that is necessary due to increasing station size suggest the use of separately excited medium voltage synchronous generators that are connected directly to the grid. In order to compensate for the disadvantage of the fixed speed of directly grid-coupled synchronous generators, there is the possibility of using differential drives.

The disadvantages of known designs are, however, the mostly complex mechanics and thus increased costs of components and maintenance. Another important point is an overall compact design of the system in order to make the power house as small as possible.

WO 2010/135754 A shows how a differential transmission can be linked to a generator in as space-saving a manner as possible. The technical design described therein does allow a compact connection of the ring gear of the differential stage to the generator shaft, but the disadvantages are that the deformations of the generator shaft that are caused by the mass and magnetization are transmitted into the differential transmission and cause unwanted deformations there in the involved components of the differential stage. This yields a tilt of the axle of the differential stage that has an adverse effect on the contact pattern. Reliable and vibration-optimized or noise-optimized long-term operation is thus no longer ensured, or the danger of massive wear in the running gears arises.

The object of the invention is to avoid the aforementioned disadvantages as much as possible and to make available a differential drive that in addition to small dimensions also ensures a reliable and dimensionally-stable linkage of the differential transmission to the shaft of the generator.

This object is achieved in the energy generating installation of the initially named type according to the invention in that the generator shaft is mounted on a housing of the generator via the ring gear carrier.

This makes possible a very compact and efficient construction of the installation with which, moreover, no major adverse effects are caused on the contact pattern of the differential stage of the energy generating installation, especially a wind power station.

Preferred embodiments of the invention are the subject matter of the other dependent claims.

Preferred embodiments of the invention are described in detail below with reference to the attached drawings.

Figure 2:
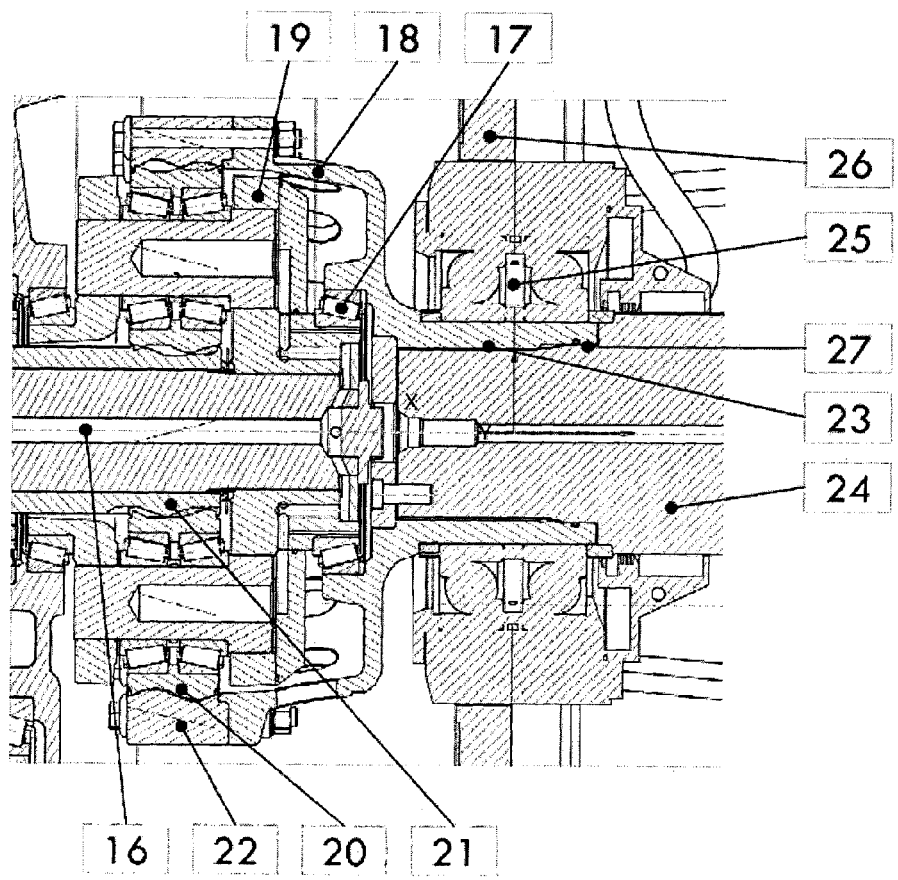
Figure 3:
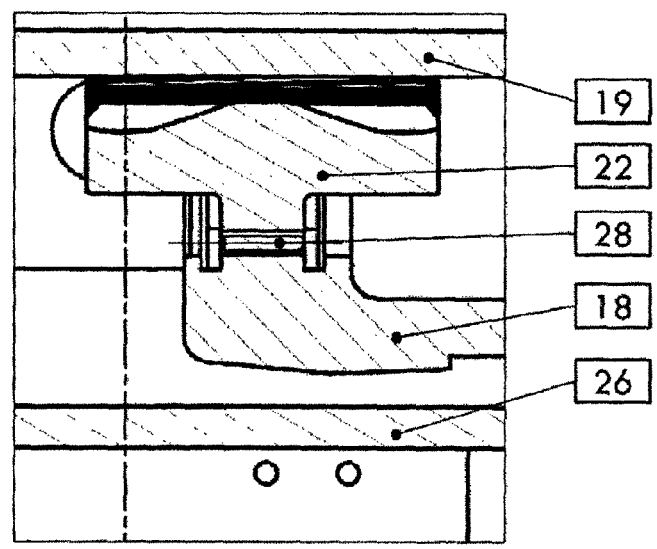

FIG. 1 shows the principle of a differential transmission with an electrical differential drive according to the state of the art, FIG. 2 shows an embodiment of a differential stage according to the invention in conjunction with this invention, FIG. 3 shows an embodiment of the mounting of the ring gear of the differential stage according to the invention.

The output of the rotor of a wind power station is computed from the following formula:

$$\text{Rotor output} = \text{rotor area} * \text{power coefficient} * \text{wind speed}^3 * \text{air density}/2$$

the power coefficient being dependent on the high speed number (=the ratio of the speed of the blade tip to the wind speed) of the rotor of the wind power station. The rotor of a wind power station is designed for an optimum power coefficient based on a high speed number that is to be established in the course of development (generally, a value of between 7 and 9). For this reason, in the operation of the wind power station in the partial load range, a correspondingly low speed of the rotor can be set to ensure optimum aerodynamic efficiency.

FIG. 1 shows one possible principle of an electromechanical differential system with a differential transmission stage 11 to 13, a matching transmission stage 3 and a differential drive 6. The differential drive 6 can be alternately an electrical or hydrodynamic or hydrostatic drive. The rotor 1 of the wind power station drives the main transmission 2. The main transmission 2 is generally a 3-stage transmission with two planetary stages and one spur wheel stage. Between the main transmission 2 and a generator 8, there is a differential stage 11 to 13 that is driven by the main transmission 2 via the planetary carrier 12 of the differential stage. Between the main transmission 2 and the differential stage 11 to 13, there are generally a clutch 14 and a main brake 15. The generator 8—preferably a synchronous generator—is connected to the ring gear 13 of the differential stage 11 to 13 and is driven by the latter. The pinion 11 of the differential stage 11 to 13 is connected to the differential drive 6 via one or more matching transmission stage(s) 3. The speed of the differential drive 6 is controlled in order, on the one hand, to ensure a constant speed of the generator 8 at a variable speed of the rotor 1 and, on the other hand, to control the torque in the complete drive line of the wind power station. The differential drive 6 is preferably a low-voltage three-phase machine that is connected to a grid via a frequency converter 7 and a transformer 5.

In order to be able to operate the differential drive 6 with an optimum speed or torque, it is possible to execute the matching transmission stage(s) 3 between the differential stage 11 to 13 and the differential drive 6, as shown by WO 2008/061263 A, as an adjustable transmission with one or alternatively also with several switching stages and thus to implement different transmission ratios. Here, when using an electromechanical differential system, the connection of the "infinitely variable transmission" named in WO 2008/061263 A to the generator-side output of the differential transmission is not necessary since the electrical differential drive 6 draws its energy from the grid or delivers its energy into it. When switching from one speed ratio to another, it is useful to carry out the switching process in a load-free manner by, for example, the torque in the differential drive and thus in the entire drive line being adjusted to roughly zero.

As an alternative to the switching stages of the adjustable transmission, it would also be possible to use a pole-changing differential drive 6.

WO 2010/135754 A shows a construction of how a differential transmission can be linked to a generator in a space-saving manner. Here, (a) the mounting of the planetary carrier, (b) the connection of the bearing structure of the ring gear (ring gear carrier) to the generator shaft, and (c) the mounting of the generator are arranged in succession on the drive-side end of the generator shaft. The second planetary carrier mounting is connected via the generator bearing and generator/transmission housing to the generator shaft and accordingly also to the ring gear and the first planetary carrier mounting.

Due to its high weight and the magnetic forces of the rotor of the generator 8, the generator shaft is exposed to correspondingly large transverse forces that are accommodated namely by the generator bearings, but cause sagging of the rotor shaft. As a consequent phenomenon, the shaft end of the generator shaft relative to the axis of rotation has an angular tilt. For the version according to WO 2010/135754 A, this means that the mounting of the planetary carrier, the ring gear carrier, and the mounting of the generator can assume different angular positions, and thus as a consequent phenomenon for the geometry of the tooth system of the differential stage, the desired positional accuracies with respect to the tilt of the axle are not achieved. Jointly with the production tolerances, this leads to increased wear and unwanted vibrations and noise emissions.

FIG. 2 shows one embodiment of the linkage of the differential transmission 11 to 13 to the generator shaft 24 according to the invention. The drive shaft 16 that is connected to the rotor 1 drives the planetary carrier 19 that is mounted in the ring gear carrier 18 by means of a planetary carrier mounting 17. The planetary gears 20 are mounted in the planetary carrier 19, and they in turn drive the pinion 21 and the ring gear 22. The ring gear carrier 18, on the one hand, is connected to the generator shaft 24 by means of a shaft-hub connection 23, which is preferably a positive shaft-hub connection or an external spline connection according to DIN 5480, and, on the other hand, bears the drive-side generator bearing 25, which is held by the bearing cover 26 of the housing of the generator 8. Instead of a two-part or multi-part version of the ring gear carrier 18 with the ring gear 22, the latter can also be made in one piece.

One important advantage of this construction is that at the angular offset that occurs, the latter cannot be transferred into the upstream differential stage since the executed shaft-hub connection 23 can only transmit torques and not bending moments. The shaft-hub connection 23 is preferably executed as an articulated connection with only centering 27. The ring gear 22 and the planetary carrier 18 are thus guided by the running gears of the differential stage and the generator bearing 25, roughly independently of the generator-shaft bending. This leads to an optimum contact pattern in the differential stage.

As has already been described above, the planetary carrier 19 is also mounted by means of the planetary carrier mounting 17 in the ring gear carrier 18, as a result of which an angular offset of the generator shaft has no direct effect on the latter and thus optimum positional accuracy of the parts of the tooth system is ensured.

In addition to the positive effects on the tooth system, this design has the additional advantage that the linkage of the differential stage to the generator shaft 24 is very short, since the generator bearing 25 and the shaft-hub connection 23 preferably lie on top of one another, i.e., in one radial plane, or at least very closely next to one another. In terms of this invention, the generator bearing 25 and the shaft-hub connection 23 then lie in one radial plane, when segments, elements or components of the generator bearing 25, on the one hand, and of the shaft-hub connection 23, on the other hand, lie in a common radial plane.

FIG. 3 shows another possibility of a connection between the ring gear carrier 18 and the ring gear 22. In contrast to the positive or nonpositive screw connection according to FIG. 2, here a connection to a shaft-hub connection 28, preferably here also a connection to a positive external spline connection according to DIN 5480, was chosen. This type of connection has the advantage that the ring gear 22 due to the tooth forces can better deform, and thus a better load distribution among the planets 20 or the running gears can be achieved.

The invention claimed is:

1. Energy generating installation, especially a wind power station, with one drive shaft, one generator (8) and with a differential transmission (11 to 13) with three drives and outputs, a first drive being connected to the drive shaft, one output being connected to a generator (8), and a second drive being connected (23) to a differential drive (6), a ring gear carrier (18) being connected to a generator shaft (24), characterized in that the generator shaft (24) is mounted (25) via the ring gear carrier (18) on a housing (26) of the generator (8).

2. Energy generating installation according to claim 1, wherein the connection between the ring gear carrier (18) and the generator shaft (24) is a positive shaft-hub connection (23), preferably an external spline connection according to DIN 5480.

3. Energy generating installation according to claim 1, wherein the connection between the ring gear carrier (18) and the generator shaft (24) is a nonpositive shaft-hub connection.

4. Energy generating installation according to claim 1, wherein a planetary carrier (12, 19) is mounted on the ring gear carrier (18) by means of a bearing (17).

5. Energy generating installation according to claim 2, wherein the positive shaft-hub connection (23), especially the external spline connection, has only unilateral centering (27).

6. Energy generating installation according to claim 5, wherein the centering (27) is located on the side of the positive shaft-hub connection (23) facing away from the differential transmission (11 to 13).

7. Energy generating installation according to claim 1, wherein the connection (23) between the ring gear carrier (18) and the generator shaft (24), on the one hand, and the bearing (25) between the ring gear carrier (18) and the housing (26) of the generator (8), on the other hand, lie in one radial plane.

8. Energy generating installation according to claim 1, wherein the connection between the ring gear carrier (18) and the ring gear (22) is a positive shaft-hub connection (28), preferably an external spline connection according to DIN 5480.

9. Energy generating installation according to claim 1, wherein the differential drive (6) is an electrical machine.

10. Energy generating installation according to claim 9, wherein the electrical machine is a permanent magnet-excited synchronous machine.

11. Energy generating installation according to claim 2, wherein a planetary carrier (12, 19) is mounted on the ring gear carrier (18) by means of a bearing (17).

12. Energy generating installation according to claim 3, wherein a planetary carrier (12, 19) is mounted on the ring gear carrier (18) by means of a bearing (17).

13. Energy generating installation according to claim 3, wherein the positive shaft-hub connection (23), especially the external spline connection, has only unilateral centering (27).

14. Energy generating installation according to claim 4, wherein the positive shaft-hub connection (23), especially the external spline connection, has only unilateral centering (27).

15. Energy generating installation according to claim 2, wherein the connection (23) between the ring gear carrier (18) and the generator shaft (24), on the one hand, and the bearing (25) between the ring gear carrier (18) and the housing (26) of the generator (8), on the other hand, lie in one radial plane.

16. Energy generating installation according to claim 3, wherein the connection (23) between the ring gear carrier (18) and the generator shaft (24), on the one hand, and the bearing (25) between the ring gear carrier (18) and the housing (26) of the generator (8), on the other hand, lie in one radial plane.

17. Energy generating installation according to claim 4, wherein the connection (23) between the ring gear carrier (18) and the generator shaft (24), on the one hand, and the bearing (25) between the ring gear carrier (18) and the housing (26) of the generator (8), on the other hand, lie in one radial plane.

18. Energy generating installation according to claim 5, wherein the connection (23) between the ring gear carrier (18) and the generator shaft (24), on the one hand, and the bearing (25) between the ring gear carrier (18) and the housing (26) of the generator (8), on the other hand, lie in one radial plane.

19. Energy generating installation according to claim 6, wherein the connection (23) between the ring gear carrier (18) and the generator shaft (24), on the one hand, and the bearing (25) between the ring gear carrier (18) and the housing (26) of the generator (8), on the other hand, lie in one radial plane.

20. Energy generating installation according to claim 7, wherein the connection (23) between the ring gear carrier (18) and the generator shaft (24), on the one hand, and the bearing (25) between the ring gear carrier (18) and the housing (26) of the generator (8), on the other hand, lie in one radial plane.

* * * * *